(12) United States Patent
Park et al.

(10) Patent No.: US 8,934,711 B2
(45) Date of Patent: Jan. 13, 2015

(54) APPARATUS AND METHOD OF PROCESSING IMAGE

(71) Applicants: Samsung Techwin Co., Ltd., Changwon (KR); Korea University Research and Business Foundation, Seoul (KR)

(72) Inventors: Du-bok Park, Seoul (KR); Han-seok Ko, Seoul (KR); Chang-won Jeon, Seoul (KR)

(73) Assignees: Samsung Techwin Co., Ltd., Changwon (KR); Korea University Research and Business Foundation, Seoul (KR)

( * ) Notice: Subject to any disclaimer, the term of this patent is extended or adjusted under 35 U.S.C. 154(b) by 79 days.

(21) Appl. No.: 13/738,543

(22) Filed: Jan. 10, 2013

(65) Prior Publication Data

US 2014/0177960 A1    Jun. 26, 2014

(30) Foreign Application Priority Data

Dec. 24, 2012  (KR) .......................... 10-2012-0152490

(51) Int. Cl.
*G06K 9/00* (2006.01)
*G06T 5/00* (2006.01)

(52) U.S. Cl.
CPC ...................................... *G06T 5/003* (2013.01)
USPC ........... 382/167; 382/162; 382/254; 382/274; 382/275

(58) Field of Classification Search
USPC .......... 382/162, 167, 254, 274, 275; 348/251, 348/254; 345/20, 63, 77, 581–618, 345/690–697
See application file for complete search history.

(56) References Cited

U.S. PATENT DOCUMENTS

| | | | |
|---|---|---|---|
| 8,396,324 B2 * | 3/2013 | Kang et al. | 382/275 |
| 2006/0125825 A1 * | 6/2006 | Law et al. | 345/426 |
| 2008/0317287 A1 | 12/2008 | Haseyama | |
| 2009/0214111 A1 * | 8/2009 | Zinaty et al. | 382/167 |
| 2010/0040300 A1 | 2/2010 | Kang et al. | |
| 2013/0141594 A1 * | 6/2013 | Hartley et al. | 348/207.1 |

FOREIGN PATENT DOCUMENTS

JP    2004-289276 A    10/2004
KR    10-2010-0021952 A    2/2010

OTHER PUBLICATIONS

Park, Dubok et al., "Fog-degraded Image Restoration using Characteristics of RGB Channel in Single Monocular Image," 2012 IEEE International Conference on Consumer Electronics (ICCE), Jan. 13-16, 2012, Las Vegas, USA, 48 pages.

* cited by examiner

*Primary Examiner* — Ali Bayat
(74) *Attorney, Agent, or Firm* — Sughrue Mion, PLLC

(57) ABSTRACT

An image processing apparatus and method for restoring an image which is expected to be when there is no fog from a foggy image, the image processing method including: generating a pixel depth image of the foggy image by estimating a plurality of pixel depths of a plurality of pixels, respectively, included in the foggy image based on a channel difference between at least two of red (R), green (G), and blue (B) channels of the foggy image; processing the pixel depth image; obtaining an optical model parameter with respect to the foggy image; and restoring an image, which is expected to be when the foggy image does not include the fog, by using the processed pixel depth image and the optical model parameter.

20 Claims, 5 Drawing Sheets

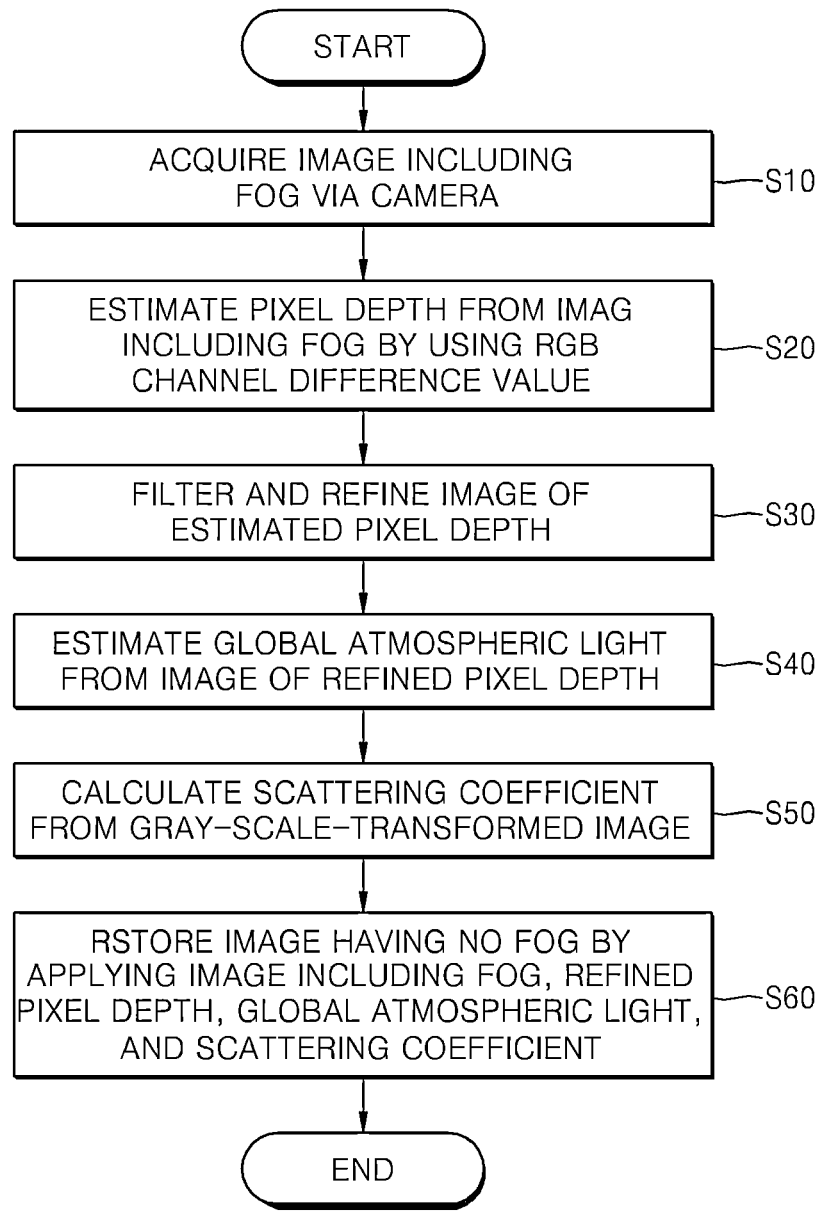

APPARATUS AND METHOD OF PROCESSING IMAGE

CROSS-REFERENCE TO RELATED PATENT APPLICATION

This application claims priority from Korean Patent Application No. 10-2012-0152490, filed on Dec. 24, 2012, in the Korean Intellectual Property Office, the disclosure of which is incorporated herein in its entirety by reference.

BACKGROUND

1. Field

Apparatuses and methods consistent with exemplary embodiments relate to image processing in which an image which is expected to be when no fog exists is restored from a foggy image.

2. Description of the Related Art

When cameras are installed outside, weather conditions caused by rain, snow, fog, etc. affect qualities of images obtained the cameras. Rain and snow have large particles which are generated sporadically and move fast during image photography. However, fog appears on an entire image, and thus degradation of a quality of an image is relatively uniform and continuously maintained.

Fog is a nature phenomenon in which steam in the air condenses and floats in the form of small particles near the ground. Visibility degradation due to fog is caused by collisions of the fog particles in the air with light and scattering of the fog particles. Light generated due to such scattering is referred to as airlight. When image photography is performed in foggy weather, objects are seen dimly due to airlight. Images having reduced visibility due to airlight do not show a clear contrast between light and shade, and have a low chroma. These characteristics may be considered as degradations of a contrast and a chroma of an image.

SUMMARY

One or more exemplary embodiments provide an image processing apparatus and method for improving the contrast or color sense of an image by recovering an image of which quality has been degraded due to fog.

According to an aspect of an exemplary embodiment, there is provided an image processing method including: generating a pixel depth image of a foggy image which includes fog therein by estimating a plurality of pixel depths of a plurality of pixels, respectively, included in the foggy image based on a channel difference between at least two of red (R), green (G), and blue (B) channels of the foggy image; processing the pixel depth image; obtaining an optical model parameter with respect to the foggy image; and restoring an image, which is expected to be when the foggy image does not include the fog, by using the processed pixel depth image and the optical model parameter.

The processing the pixel depth image includes filtering and refining the pixel depth image.

The estimating the pixel depth may include: setting a block comprising at least pixels, in the foggy image; calculating the channel difference with respect to each pixel of the block, and obtaining the largest channel difference among the calculated channel differences; and estimating the largest channel difference as a pixel depth of the block.

The estimating the pixel depth of the at least one pixel may further include shifting the block in the foggy image in units of pixels to set another block, calculating the channel difference with respect to each pixel of the other block and obtaining the largest channel difference among the calculated channel differences in the other block, and estimating the largest channel difference as a pixel depth of the other block.

The processing the pixel depth image may include: obtaining a first filter coefficient from an image which is gray-scale-transformed from the foggy image and the pixel depth image; obtaining a second filter coefficient by using the gray-scale-transformed image, the pixel depth image and the first filter coefficient; and refining the pixel depth image using a sum of the second filter coefficient and a product of the first filter coefficient and a pixel value of the gray-scale-transformed image.

The obtaining the first filter coefficient may include: calculating a first value by multiplying a gray scale value and a pixel depth value of a pixel in a block having an arbitrary pixel as a center of the block in the gray-scale-transformed image and dividing a product of the gray scale value and the pixel depth value by a total number of pixels included in the block; calculating a second value by multiplying a pixel average value of the block in the gray-scale-transformed image by a pixel average value of the block in the pixel depth image; calculating a third value by adding a variance value of the block in the gray-scale-transformed image to a normalization parameter; and calculating the first filter coefficient by dividing a difference between the first value and the second value by the third value.

The obtaining the second filter coefficient may include: calculating a fourth value by multiplying the first filter coefficient by a pixel average value of the block in the gray-scale-transformed image; and calculating the second filter coefficient by subtracting the fourth value from a pixel average value of the block in the pixel depth image.

The obtaining the optical model parameter may include: estimating global atmospheric light from the processed pixel depth image; and calculating a scattering coefficient from an image which is gray-scaled-transformed from the foggy image.

The estimating the global atmospheric light may include: extracting pixel values of at least two pixels among the plurality of pixels from the processed pixel depth image; and estimating the largest pixel value among the extracted pixel value as the global atmospheric light of the foggy image.

The calculating the scattering coefficient may be performed by subtracting a standard deviation of the gray-scale-transformed image from a given natural number.

According to an aspect of another exemplary embodiment, there is provided an image processing apparatus including: a depth estimation unit which generates a pixel depth image of a foggy image which includes fog therein by estimating a plurality of pixel depths of a plurality of pixels, respectively, included in the foggy image based on a channel difference between at least two of red (R), green (G), and blue (B) channels of the foggy image; a refining unit which processes the pixel depth image; a parameter unit which obtains an optical model parameter with respect to the foggy image; and a restoration unit which restores an image, which is expected to be when the foggy image does not include the fog, by using the processed pixel depth image and the optical model parameter.

The depth estimation unit may shift the block in the foggy image in units of pixels to set another block, calculates the channel difference with respect to each pixel of the other block and obtains the largest channel difference among the calculated channel differences in the other block, and estimates the largest channel difference as a pixel depth of the other block.

The depth estimation unit may set a block comprising at least two pixels, in the foggy image, calculates the channel difference with respect to each pixel of the block, and obtains the largest channel difference among the calculated channel differences, and estimates the largest channel difference as a pixel depth of the block.

The refining unit may refine the pixel depth image by obtaining a first filter coefficient and a second filter coefficient from an image which is gray-scale-transformed from the foggy image and the pixel depth image and using a sum of the second filter coefficient and a product of the first filter coefficient and a pixel value of the gray-scale-transformed image.

When calculating the first filter coefficient, the refining unit may calculate a first value by multiplying a gray scale value and a pixel depth value of a pixel in a block having an arbitrary pixel as a center of the block in the gray-scale-transformed image and dividing a product of the gray scale value and the pixel depth value by a total number of pixels included in the block, calculates a second value by multiplying a pixel average value of the block in the gray-scale-transformed image by a pixel average value of the block in the pixel depth image, calculates a third value by adding a variance value of the block in the gray-scale-transformed image to a normalization parameter, and calculates the first filter coefficient by dividing a difference between the first value and the second value by the third value.

When calculating the second filter coefficient, the refining unit may calculate a fourth value by multiplying the first filter coefficient by a pixel average value of the block in the gray-scale-transformed image, and calculates the second filter coefficient by subtracting the fourth value from a pixel average value of the block in the pixel depth image.

The global atmospheric light estimation unit may extract pixel values of at least two pixels among the plurality of pixels from the processed pixel depth image, and estimates the largest pixel value among the extracted pixels value as the global atmospheric light of the foggy image.

The scattering coefficient calculation unit may calculate the scattering coefficient by subtracting a standard deviation of the gray-scale-transformed image from a given natural number.

BRIEF DESCRIPTION OF THE DRAWINGS

The above and other aspects will become more apparent by describing in detail exemplary embodiments with reference to the attached drawings, in which:

FIG. 5 is a flowchart of an image processing method according to an exemplary embodiment.

DETAILED DESCRIPTION OF THE EXEMPLARY EMBODIMENTS

Figure 1:
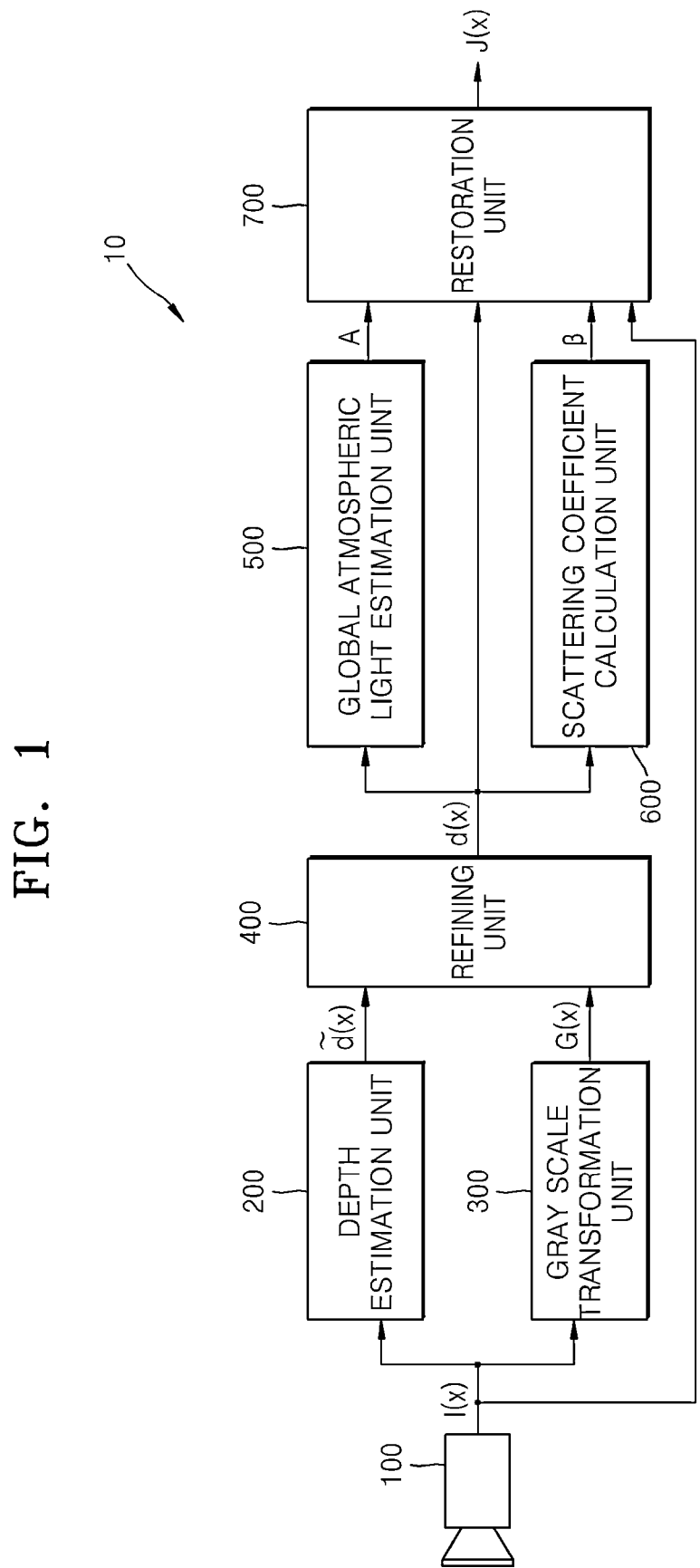
FIG. 1 is a block diagram of an image processing apparatus according to an exemplary embodiment.

As the inventive concept allows for various changes and numerous embodiments, particular exemplary embodiments will be described here below in reference to the accompanying drawings. However, these embodiments are not intended to limit the inventive concept thereto, and instead, it is to be appreciated that all changes, equivalents, and substitutes that do not depart from the spirit and scope of the inventive concept are encompassed by the present application. In the description, if it is determined that a detailed description of commonly-used technologies related to the inventive concept may unnecessarily obscure the subject matter of the inventive concept, the detailed description will be omitted.

It will be understood that, although the terms 'first', 'second', 'third', etc., may be used herein to describe various elements, these elements should not be limited by these terms. These terms are only used to distinguish one element from another element.

The terminology used herein is for the purpose of describing particular embodiments only and is not intended to be limiting the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, integers, steps, operations, elements, components, or combinations thereof, but do not preclude the presence or addition of one or more other features, integers, steps, operations, elements, components, or combinations thereof.

The inventive concept may be described in terms of functional block components and various processing steps. Such functional blocks may be realized by any number of hardware and/or software components configured to perform the specified functions. For example, the inventive concept may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements, the inventive concept may be implemented with any programming or scripting language such as C, C++, Java, assembler, or the like, with the various algorithms being implemented with any combination of data structures, objects, processes, routines or other programming elements. Functional aspects may be implemented by using algorithms that are executed by on one or more processors. Furthermore, the inventive concept could employ any number of related art techniques for electronics configuration, signal processing, data processing, and the like. The words "mechanism", "element", "means", and "configuration" are used broadly and are not limited to mechanical or physical embodiments, but can include software routines in conjunction with processors, etc.

Hereinafter, the exemplary embodiments will be described in detail with reference to the accompanying drawings. Like reference numerals in the drawings denote like elements, and thus their description will be omitted.

An image including fog existing in the air may be expressed as a physical model as expressed by Equation 1:

$$I(x)=I_d(x)+I_a(x) \quad \text{[Equation 1]}$$

wherein $I_d(x)=J(x)e^{-\beta d(x)}$, $I_a(x)=A(1-e^{-\beta d(x)})$ $$\therefore I(x)=J(x)e^{-\beta d(x)}+A(1-e^{-\beta d(x)}),$$

where I(x) represents an image with fog captured by a camera 100, $I_d(x)$ represents an image captured by the camera 100 when noise, such as fog, rain, or snow, does not exist in the air, and $I_a(x)$ represents an image distorted due to scattering of light. In addition, J(x) represents an image which is expected when no fog exists, β represents a scattering coefficient and has an identical value within an image and increases its value as the concentration of fog increases, d(x)

represents a depth of a refined pixel within an image, and A represents the atmospheric light which is assumed to be globally constant.

A final equation for restoring an image expected when no fog exists by using the physical model of the image including fog may be expressed as Equation 2:

$$J(x)=A-(A-I(x))e^{\beta d(x)} \quad \text{[Equation 2]}$$

According to an exemplary embodiment, the image J(x) expected when no fog exists may be restored by substituting the image I(x) including fog, the scattering coefficient β, the refined pixel depth d(x), and the global atmospheric light A into Equation 2.

FIG. 1 is a block diagram of an image processing apparatus 10 according to an exemplary embodiment.

Referring to FIG. 1, the image processing apparatus 10 includes the camera 100, a depth estimation unit 200, a gray scale transformation unit 300, a refining unit 400, a global atmospheric light estimation unit 500, a scattering coefficient calculation unit 600, and a restoration unit 700.

Figures 4A, 4B, 4C, 4D:
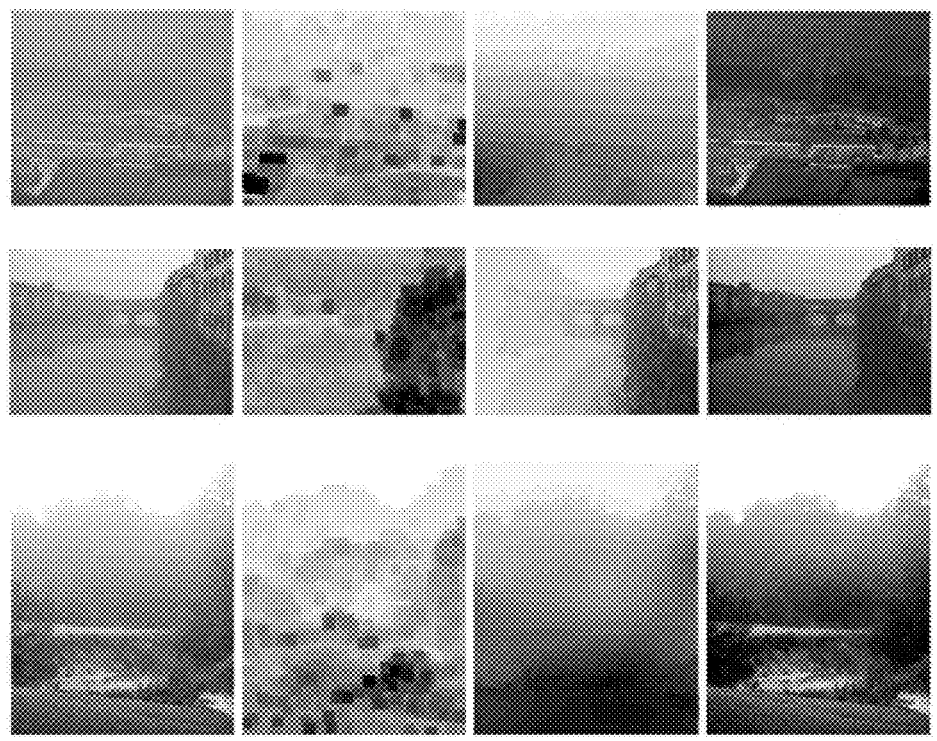
FIGS. 4A through 4D are pictures showing foggy images, depth images, refined images, and restored images, respectively, according to an exemplary embodiment.

The camera 100 captures the image I(x) including fog. The camera 100 captures an image by using, for example, a complementary metal-oxide semiconductor (CMOS) module or a charge coupled device (CCD) module. The captured image (or a moving picture) is provided to the CMOS module or the CCD module via a lens, and the CMOS module or the CCD module transforms an optical signal of an object passed through the lens into an electrical signal (a photographing signal) and outputs the electrical signal. The camera 100 may be a pan-tilt-zoom (PTZ) camera in which an electric zoom lens is installed in a pan/tilt driving device that is rotatable in all directions. FIG. 4A illustrates the image I(x) with fog captured by the camera 100.

The depth estimation unit 200 estimates a pixel depth $\tilde{d}(x)$ from the image I(x) with fog received from the camera 100, by using neighboring pixels.

Figures 2A, 2B:
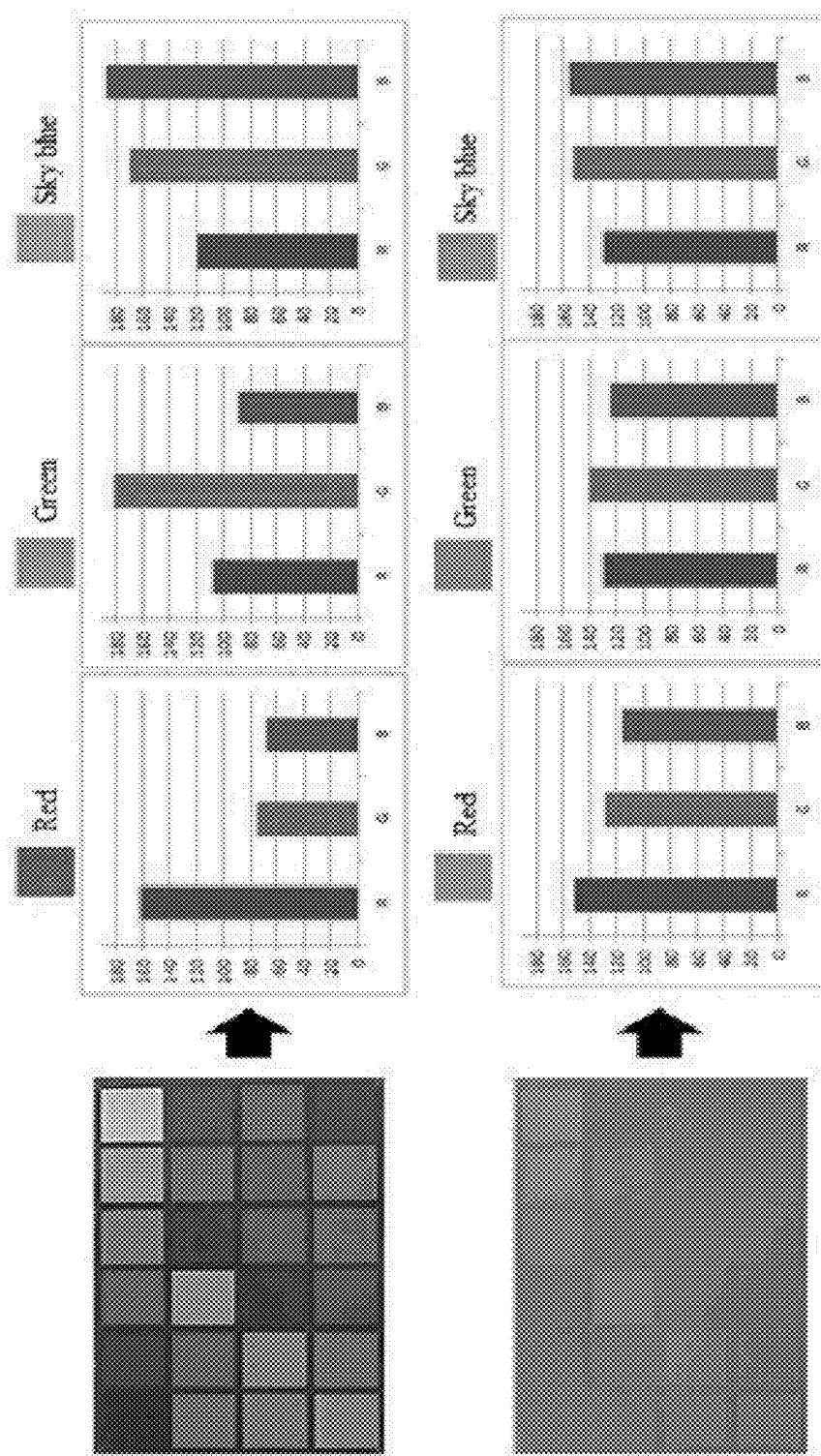
FIGS. 2A and 2B illustrate the characteristics of red, green, blue (RGB) channels depending on the concentration of fog, according to an exemplary embodiment.

In general, in an image including fog, since fog affects more on a farther positioned object than on a closer object, the farther positioned object is dimmer than the closer object in the image. In other words, a difference between red (R), green (G), and blue (B) channels, namely, an RGB channel difference of the farther positioned object is smaller than that of the closer object. FIGS. 2A and 2B illustrate the characteristics of R, G and B channels depending on the concentration of fog. FIG. 2A illustrates the characteristics of R, G and B channels of an image including no fog, and FIG. 2B illustrates the characteristics of R, G and B channels of an image including fog. In comparison between FIGS. 2A and 2B, an RGB channel difference of FIG. 2B is less than that of FIG. 2A. Accordingly, as fog becomes thicker, the RGB channel difference decreases.

Figure 3A:
FIGS. 3A through 3C are pictures showing relationships between a depth and an RGB channel of a foggy image.
Figure 3B:
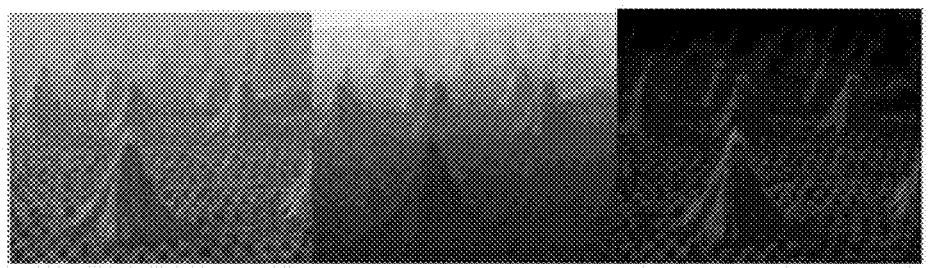
Figure 3C:
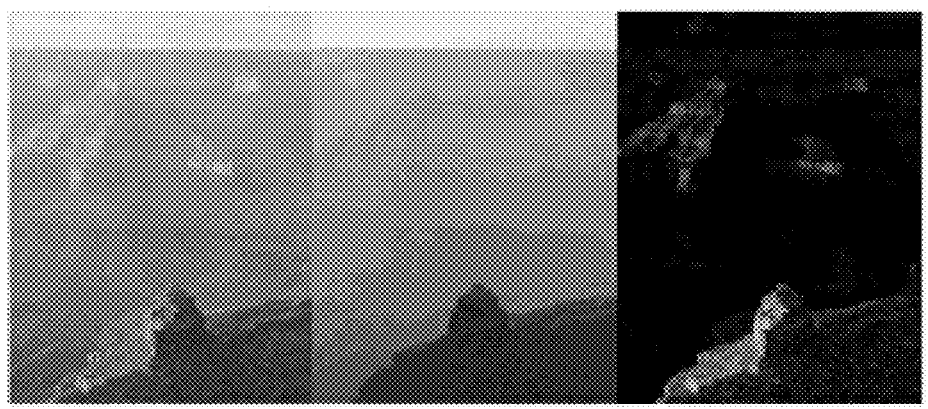

FIGS. 3A through 3C are pictures showing relationships between a depth and an RGB channel of a foggy image. FIG. 3A illustrates an image including fog, FIG. 3B illustrates a relative depth image of a real image, and FIG. 3C illustrates an image that shows an RGB channel difference of the image including fog.

In FIG. 3C, since depth estimation is performed based on pixels, even equidistantly-located objects may have different depth values. This may cause image distortion during restoration.

Accordingly, to address this problem, the depth estimation unit 200 estimates the pixel depth $\tilde{d}(x)$ from the image I(x) including fog received from the camera 100, by using neighboring pixels, by using Equation 3:

$$\tilde{d}(x) = 1 - \alpha\max_{y\in\Omega x} \|P(y)\|_2 \quad \text{[Equation 3]}$$

wherein, $$\|P(y)\|_2 = \sqrt{(R(y) - G(y))^2 + (G(y) - B(y))^2 + (B(y) - R(y))^2},$$

where α indicates a normalizing factor, namely, a constant, for readjusting the pixel depth $\tilde{d}(x)$ to a value ranging from 0 to 1, Ω(x) indicates an N×N block having a pixel x as a center, in the image, for example, a 3×3 block, and y indicates a coordinate of a pixel included in the N×N block. In the case of a 3×3 block, y indicates a coordinate of one pixel among nine pixels. In Equation 3, $\|P(y)\|_2$ indicates an RGB channel difference in a broad sense, and $\max_{y\in\Omega x}\|P(y)\|_2$ indicates a pixel value having the largest RGB channel difference from among the N×N block having the pixel x as a center. Referring to Equation 3, as the RGB channel difference decreases, the pixel depth $\tilde{d}(x)$ increases, and, as the RGB channel difference increases, the pixel depth $\tilde{d}(x)$ decreases.

When describing the depth estimation in detail by using Equation 3, the depth estimation unit 200 sets an N×N block having a pixel x as a center of the block, in the image I(x) including fog. After the N×N block is set, an RGB channel difference value for each pixel of the N×N block is calculated. After the largest RGB channel difference value from among the calculated RGB channel difference values is assumed to be the RGB channel difference value of the center of the N×N block, the RGB channel difference value of the center is estimated as the pixel depth $\tilde{d}(x)$ of the N×N block. For example, in a 3×3 block, respective RGB channel difference values for pixels (1, 1), (1, 2), (1, 3), (2, 1), (2, 2), (2, 3), (3, 1), (3, 2), and (3, 3) are calculated, the largest RGB channel difference value is assumed to be the RGB channel difference value of the pixel (2, 2), and this RGB channel difference value of the cell (2, 2) is estimated as the pixel depth $\tilde{d}(x)$ of the 3×3 block. In this way, the depth estimation unit 200 may estimate pixel depths in the entire image while shifting the N×N block in the image I(x) with fog in units of pixels. FIG. 4B illustrates an image of pixel depths with respect to the image I(x) of FIG. 4A.

The gray scale transformation unit 300 transforms the image I(x) with fog received from the camera 100 into a gray scale image G(x). It may be considered that the gray scale transformation unit 300 transforms a three-dimensional (3D) image including fog into a one-dimensional (1D) image.

The refining unit 400 refines the image of the pixel depth by guided-filtering the gray scale transformed foggy image G(x) and the image of the pixel depth. In the case of the image of the pixel depth estimated by using peripheral pixels, since a block artifact phenomenon may occur around edges of objects in the image, the refining unit 400 preserves the edges of objects in the image of the pixel depth so that the edges are similar to the edges in the original image, that is, the image including fog, via guided filtering, and also smoothes the remaining portion of the image.

The refining of the image of the pixel depth by guided filtering may be expressed as in Equation 4:

$$d(x) = \frac{1}{|w|}\sum_{k|i\in w_k}(a_k G_i + b_k) \quad \text{[Equation 4]}$$

-continued wherein, $$a_k = \frac{\frac{1}{|w|}\sum_{i \in w_k} G_i \tilde{d}_i - \mu_k \bar{d}_k}{\sigma_k^2 + \varepsilon}, \forall i \in w_k$$

$$b_k = \bar{d}_k - a_k \mu_k,$$

where $d(x)$ indicates a refined pixel depth obtained by refining the image of the pixel depth, $w_k$ indicates an M×M block having a pixel k as a center of the block, for example, a 3×3 block, and $\|w\|$ indicates the total number of pixels in the M×M block. For example, in the case of a 3×3 block, $\|w\|$ is 9. In Equation 4, k indicates respective pixel coordinates of the M×M block. For example, in the case of the 3×3 block, k indicates (1, 1), (1, 2), (1, 3), (2, 1), (2, 2), (2, 3), (3, 1), (3, 2), and (3, 3). In addition, i indicates a pixel coordinate which is to be calculated. For example, in the case of the 3×3 block, i may be (2, 2). Moreover, $G_i$ indicates a gray scale value on the pixel coordinate i, which is to be calculated, $a_k$ and $b_k$ indicate guided filter coefficients, $\tilde{d}_i$ indicates a pixel depth value on the pixel coordinate i, which is to be calculated, $\mu_k$ indicates a pixel average value of the M×M block in a gray-scale-transformed image, $\bar{d}_k$ indicates a pixel average value of the M×M block in a pixel depth image, $\sigma k^2$ indicates variance values of the M×M block in the gray-scale-transformed image, and $\epsilon$ may be set to a normalization parameter, for example, $10^{-4}$, for preventing the guided filter coefficient $a_k$ from being divided by 0 or greatly increasing.

To calculate the guided filter coefficient $a_k$, first, a first value is calculated by multiplying a gray scale value and a pixel depth value of the pixel coordinate i, which is to be calculated, of the M×M block having the pixel k as a center of the block in the gray-scale-transformed image and dividing the product of the gray scale value and the pixel depth value by the total number of pixels included in the M×M block. Second, a second value is calculated by multiplying the pixel average value of the M×M block in the gray-scale-transformed image by the pixel average value of the M×M block in the pixel depth image. Third, a third value is calculated by adding the variance value of the M×M block in the gray-scale-transformed image to the normalization parameter. Finally, the guided filter coefficient is obtained by dividing a difference between the first and second values by the third value.

The guided filter coefficient $b_k$ is obtained by subtracting the product of the guided filter coefficient $a_k$ and the pixel average value of the M×M block in the gray-scale-transformed image from the pixel average value of the M×M block in the pixel depth image.

Consequently, the refining unit 400 adds the product of the guided filter coefficient $a_k$ and the gray scale value $G_i$ of the coordinate i of the M×M block in the gray-scale-transformed image to the guided filter coefficient $b_k$, divides the sum of the product and the guided filter coefficient $b_k$ by the total number of pixels included in the M×M block, and outputs a result of the division as the refined pixel depth $d(x)$ of the block. FIG. 4C illustrates an image of the refined pixel depth $d(x)$.

Although the refining unit 400 uses a guided filter in the present embodiment, the inventive concept is not limited thereto, and a weighted least square (WLS) filter, an edge-preserving smoothing filter, or the like may be used.

The global atmospheric light estimation unit 500 estimates global atmospheric light A from the image of the refined pixel depth. The global atmospheric light A represents a pixel value of a region having an infinite depth in an image including fog.

The global atmospheric light estimation unit 500 extracts pixels having top 5% pixel values from the image of the refined pixel depth and estimates a highest pixel value from among the extracted pixel values as the global atmospheric light A of the image including fog.

The scattering coefficient calculation unit 600 calculates a scattering coefficient β by using the standard deviation of the gray-scale-transformed image. The scattering coefficient β represents the concentration of fog. The larger the value of the scattering coefficient β is, the higher the concentration of fog is, and, the smaller the value of the scattering coefficient β is, the lower the concentration of fog is. Since an image having thick fog has a low contrast, the standard deviation of the image tends to be low. Accordingly, the scattering coefficient β may be calculated using the standard deviation of the gray-scale-transformed image, as in Equation 5:

$$\beta = 1 - \sigma_1, \quad \text{[Equation 5]}$$

where $\sigma_1$ indicates the standard deviation of the gray-scale-transformed image. Referring to Equation 5, the scattering coefficient calculation unit 600 subtracts the standard deviation $\sigma_1$ of the gray-scale-transformed image from a first natural number, for example, 1, to obtain the scattering coefficient β.

The restoration unit 700 restores the image $J(x)$ expected when no fog exists, by substituting the image $I(x)$ with fog captured by the camera 100, the refined pixel depth $d(x)$ obtained by the refining unit 400, the global atmospheric light A estimated by the global atmospheric light estimation unit 500, and the scattering coefficient β calculated by the scattering coefficient calculation unit 600 into Equation 2.

As described above, the contrast or color sense of an image may be improved by recovering an image of which quality is degraded due to fog.

FIG. 5 is a flowchart of an image processing method according to an exemplary embodiment. Repeated descriptions of matters described above with reference to FIGS. 1 through 4 are omitted here below.

Referring to FIG. 5, in operation S10, the image processing apparatus 10 acquires an image including fog from a camera.

When the image including fog is acquired, the image processing apparatus 10 estimates pixel depths from the image including fog by using RGB channel difference values, in operation S20. During the estimation of the pixel depths, the image processing apparatus 10 sets an N×N block, in the image with fog, having an arbitrary pixel as a center of the block and calculates RGB channel difference values of each of the N×N block. Thereafter, the image processing apparatus 10 sets the largest RGB channel difference value from among the calculated RGB channel difference values to be the RGB channel difference value of the center of the N×N block, and estimates the RGB channel difference value of the center as the pixel depth of the N×N block.

When the estimation of the pixel depths is completed, the image processing apparatus 10 filters and refines an image of the estimated pixel depth, namely, a pixel depth image, in operation S30. At this stage, the image processing apparatus 10 may further include an operation (not shown) of transforming a gray scale of the image including fog to obtain a gray-scale-transformed image. In this case, the image processing apparatus 10 obtains a first filter coefficient from the gray-scale-transformed image and the image of the pixel depth. Next, the image processing apparatus 10 obtains a second filter coefficient by using the gray-scale-transformed image, the image of the pixel depth, and the first filter coefficient. Finally, a result of the refining is obtained using a sum of the second filter coefficient and the product of the first filter coefficient and a gray scale value of the gray-scale-transformed image. To calculate the first filter coefficient, first, the image processing apparatus 10 calculates a first value by multiplying a gray scale value and a pixel depth value of a target pixel from among an M×M block having an arbitrary pixel as a center of the block in the gray-scale-transformed image and dividing the product of the gray scale value and the pixel depth value by the total number of pixels included in the M×M block. Next, the image processing apparatus 10 calculates a second value by multiplying a pixel average value of the M×M block in the gray-scale-transformed image by a pixel average value of the M×M block in the pixel depth image. Thereafter, the image processing apparatus 10 calculates a third value by adding a variance value of the M×M block in the gray-scale-transformed image to a normalization parameter. Finally, the image processing apparatus 10 calculates the first filter coefficient by dividing a difference between the first value and the second value by the third value. To calculate the second filter coefficient, the image processing apparatus 10 calculates a fourth value by multiplying the first filter coefficient by the pixel average value of the M×M block in the gray-scale-transformed image. Next, the image processing apparatus 10 calculates the second filter coefficient by subtracting the fourth value from the pixel average value of the M×M block in the pixel depth image.

When the refining of the pixel depth image is completed, the image processing apparatus 10 estimates global atmospheric light from an image of the refined pixel depth, in operation S40. During estimation of the global atmospheric light, the image processing apparatus 10 extracts a top 5% pixel values from the image of the refined pixel depth and estimates the highest pixel value from among the extracted top 5% pixel values as the global atmospheric light of the image including fog.

When the estimation of the global atmospheric light is completed, the image processing apparatus 10 calculates a scattering coefficient from the gray-scale-transformed image, in operation S50. The image processing apparatus 10 calculates a scattering coefficient by subtracting the standard deviation of the gray-scale-transformed image from 1.

When the calculation of the scattering coefficient is completed, the image processing apparatus 10 restores an image having no fog by applying the image including fog, the refined pixel depth, the global atmospheric light, and the scattering coefficient to Equation 2, in operation S60.

As described above, according to the above embodiments, the contrast or color sense of an image may be improved by recovering an image of which quality is degraded due to fog.

The exemplary embodiments can be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the inventive concept pertains.

Up to now, the inventive concept has been described by referring to exemplary embodiments. While the exemplary embodiments have been particularly shown and described, it will be understood by those of ordinary skill in the art that various changes in form and details may be made therein without departing from the spirit and scope as defined by the appended claims. Therefore, the exemplary embodiments should be considered in descriptive sense only and not for purposes of limitation. Therefore, the scope is defined not by the detailed description of exemplary embodiments, but by the appended claims, and all differences within the scope will be construed as being included in the inventive concept.

What is claimed is:

1. An image processing method comprising:
generating a pixel depth image of a foggy image which includes fog therein by estimating a plurality of pixel depths of a plurality of pixels, respectively, included in the foggy image based on a channel difference between at least two of red (R), green (G), and blue (B) channels of the foggy image;
processing the pixel depth image;
obtaining an optical model parameter with respect to the foggy image; and
restoring an image, which is expected to be when the foggy image does not include the fog, by using the processed pixel depth image and the optical model parameter.

2. The image processing method of claim 1, wherein the processing the pixel depth image comprises filtering and refining the pixel depth image.

3. The image processing method of claim 1, wherein the estimating the pixel depths comprises:
setting a block comprising at least pixels, in the foggy image; calculating the channel difference with respect to each pixel of the block, and obtaining the largest channel difference among the calculated channel differences; and
estimating the largest channel difference as a pixel depth of the block.

4. The image processing method of claim 3, the estimating the pixel depth of the at least one pixel further comprises shifting the block in the foggy image in units of pixels to set another block, calculating the channel difference with respect to each pixel of the other block and obtaining the largest channel difference among the calculated channel differences in the other block, and estimating the largest channel difference as a pixel depth of the other block.

5. The image processing method of claim 1, wherein the processing the pixel depth image comprises:
obtaining a first filter coefficient from an image which is gray-scale-transformed from the foggy image and the pixel depth image;
obtaining a second filter coefficient by using the gray-scale-transformed image, the pixel depth image and the first filter coefficient; and
refining the pixel depth image using a sum of the second filter coefficient and a product of the first filter coefficient and a pixel value of the gray-scale-transformed image.

6. The image processing method of claim 5, wherein the obtaining the first filter coefficient comprises:
calculating a first value by multiplying a gray scale value and a pixel depth value of a pixel in a block having an arbitrary pixel as a center of the block in the gray-scale-transformed image and dividing a product of the gray scale value and the pixel depth value by a total number of pixels included in the block;
calculating a second value by multiplying a pixel average value of the block in the gray-scale-transformed image by a pixel average value of the block in the pixel depth image;

calculating a third value by adding a variance value of the block in the gray-scale-transformed image to a normalization parameter; and calculating the first filter coefficient by dividing a difference between the first value and the second value by the third value.

7. The image processing method of claim 5, wherein the obtaining the second filter coefficient comprises:
   calculating a fourth value by multiplying the first filter coefficient by a pixel average value of the block in the gray-scale-transformed image; and
   calculating the second filter coefficient by subtracting the fourth value from a pixel average value of the block in the pixel depth image.

8. The image processing method of claim 1, wherein the obtaining the optical model parameter comprises:
   estimating global atmospheric light from the processed pixel depth image; and
   calculating a scattering coefficient from an image which is gray-scaled-transformed from the foggy image.

9. The image processing method of claim 8, wherein the estimating the global atmospheric light comprises:
   extracting pixel values of at least two pixels among the plurality of pixels from the processed pixel depth image; and
   estimating the largest pixel value among the extracted pixel value as the global atmospheric light of the foggy image.

10. The image processing method of claim 8, wherein the calculating the scattering coefficient is performed by subtracting a standard deviation of the gray-scale-transformed image from a given natural number.

11. An image processing apparatus comprising:
    a depth estimation unit which generates a pixel depth image of a foggy image which includes fog therein by estimating a plurality of pixel depths of a plurality of pixels, respectively, included in the foggy image based on a channel difference between at least two of red (R), green (G), and blue (B) channels of the foggy image;
    a refining unit which processes the pixel depth image;
    a parameter unit which obtains an optical model parameter with respect to the foggy image; and
    a restoration unit which restores an image, which is expected to be when the foggy image does not include the fog, by using the processed pixel depth image and the optical model parameter.

12. The image processing apparatus of claim 11, wherein the depth estimation unit sets a block comprising at least two pixels, in the foggy image, calculates the channel difference with respect to each pixel of the block, and obtains the largest channel difference among the calculated channel differences, and estimates the largest channel difference as a pixel depth of the block.

13. The image processing apparatus of claim 12, the depth estimation unit shifts the block in the foggy image in units of pixels to set another block, calculates the channel difference with respect to each pixel of the other block and obtains the largest channel difference among the calculated channel differences in the other block, and estimates the largest channel difference as a pixel depth of the other block.

14. The image processing apparatus of claim 11, wherein the refining unit refines the pixel depth image by obtaining a first filter coefficient and a second filter coefficient from an image which is gray-scale-transformed from the foggy image and the pixel depth image and using a sum of the second filter coefficient and a product of the first filter coefficient and a pixel value of the gray-scale-transformed image.

15. The image processing apparatus of claim 14, wherein, when calculating the first filter coefficient, the refining unit calculates a first value by multiplying a gray scale value and a pixel depth value of a pixel in a block having an arbitrary pixel as a center of the block in the gray-scale-transformed image and dividing a product of the gray scale value and the pixel depth value by a total number of pixels included in the block, calculates a second value by multiplying a pixel average value of the block in the gray-scale-transformed image by a pixel average value of the block in the pixel depth image, calculates a third value by adding a variance value of the block in the gray-scale-transformed image to a normalization parameter, and calculates the first filter coefficient by dividing a difference between the first value and the second value by the third value.

16. The image processing apparatus of claim 14, wherein, when calculating the second filter coefficient, the refining unit calculates a fourth value by multiplying the first filter coefficient by a pixel average value of the block in the gray-scale-transformed image, and calculates the second filter coefficient by subtracting the fourth value from a pixel average value of the block in the pixel depth image.

17. The image processing apparatus of claim 1, wherein the parameter unit comprises:
    a global atmospheric light estimation unit which estimates global atmospheric light from the processed pixel depth image; and
    a scattering coefficient calculation unit which calculates a scattering coefficient from an image which is gray-scaled-transformed from the foggy image.

18. The image processing apparatus of claim 17, wherein the global atmospheric light estimation unit extracts pixel values of at least two pixels among the plurality of pixels from the processed pixel depth image, and estimates the largest pixel value among the extracted pixels value as the global atmospheric light of the foggy image.

19. The image processing apparatus of claim 17, wherein the scattering coefficient calculation unit calculates the scattering coefficient by subtracting a standard deviation of the gray-scale-transformed image from a given natural number.

20. A non-transitory computer readable recording medium having recorded thereon a program for executing an image processing method comprising:
    generating a pixel depth image of a foggy image which includes fog therein by estimating a plurality of pixel depths of a plurality of pixels, respectively, included in the foggy image based on a channel difference between at least two of red (R), green (G), and blue (B) channels of the foggy image;
    processing the pixel depth image;
    obtaining an optical model parameter with respect to the foggy image; and
    restoring an image, which is expected to be when the foggy image does not include the fog, by using the processed pixel depth image and the optical model parameter.

* * * * *